US011892564B2

United States Patent
Phinisee et al.

(10) Patent No.: US 11,892,564 B2
(45) Date of Patent: Feb. 6, 2024

(54) SENSOR APPARATUS WITH CLEANING

(71) Applicant: Ford Global Technologies, LLC, Dearborn, MI (US)

(72) Inventors: Rashaun Phinisee, Ypsilanti, MI (US); Raghuraman Surineedi, Dearborn, MI (US); Venkatesh Krishnan, Canton, MI (US); Segundo Baldovino, Novi, MI (US); Taneshia Turner, Dearborn, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 793 days.

(21) Appl. No.: 17/038,133

(22) Filed: Sep. 30, 2020

(65) Prior Publication Data

US 2022/0099802 A1 Mar. 31, 2022

(51) Int. Cl.
*G01S 1/54* (2006.01)
*G01S 7/481* (2006.01)
*G01S 17/10* (2020.01)
*B60S 1/54* (2006.01)
*G01P 3/481* (2006.01)
*B60S 1/56* (2006.01)
*G01S 17/931* (2020.01)
(Continued)

(52) U.S. Cl.
CPC ........... *G01S 7/4813* (2013.01); *B60S 1/0848* (2013.01); *B60S 1/52* (2013.01); *B60S 1/54* (2013.01); *B60S 1/56* (2013.01); *G01P 3/481* (2013.01); *G01S 17/10* (2013.01); *G01S 17/931* (2020.01)

(58) Field of Classification Search
CPC ...... G01S 7/4813; G01S 17/10; G01S 17/931; B60S 1/0848; B60S 1/52; B60S 1/54; B60S 1/56; G01P 3/481
See application file for complete search history.

(56) References Cited

U.S. PATENT DOCUMENTS 9,707,896 B2  7/2017  Boegel et al.
10,328,906 B2  6/2019  Hester et al.
(Continued)

FOREIGN PATENT DOCUMENTS

CN  204346369 U  5/2015
CN  206122020 U  4/2017

*Primary Examiner* — Qingzhang Zhou
(74) *Attorney, Agent, or Firm* — Frank A. MacKenzie; Bejin Bieneman PLC

(57) ABSTRACT

A sensor apparatus includes a cylindrical sensor window defining an axis and an air nozzle positioned at one end of the sensor window and shaped to direct airflow in a direction parallel to the axis across the sensor window. The air nozzle extends circumferentially relative to the axis around the sensor window. The nozzle is formed of an inner edge and an outer edge each extending circumferentially relative to the axis around the sensor window. The inner edge is circular with a radius at least as great as an outer radius of the sensor window. The outer edge includes a first portion with a semicircular shape with a radius smaller than the outer radius of the sensor window and a second portion that extends circumferentially relative to the axis around the sensor window from the first portion to the first portion at a constant radial distance from the inner edge.

20 Claims, 4 Drawing Sheets

(51) Int. Cl.
  *B60S 1/08* (2006.01)
  *B60S 1/52* (2006.01)

(56) References Cited

U.S. PATENT DOCUMENTS

| | | |
|---|---|---|
| 10,676,070 B2 | 6/2020 | Giraud et al. |
| 2020/0188965 A1* | 6/2020 | Monrad ................... B08B 3/04 |

* cited by examiner

SENSOR APPARATUS WITH CLEANING

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
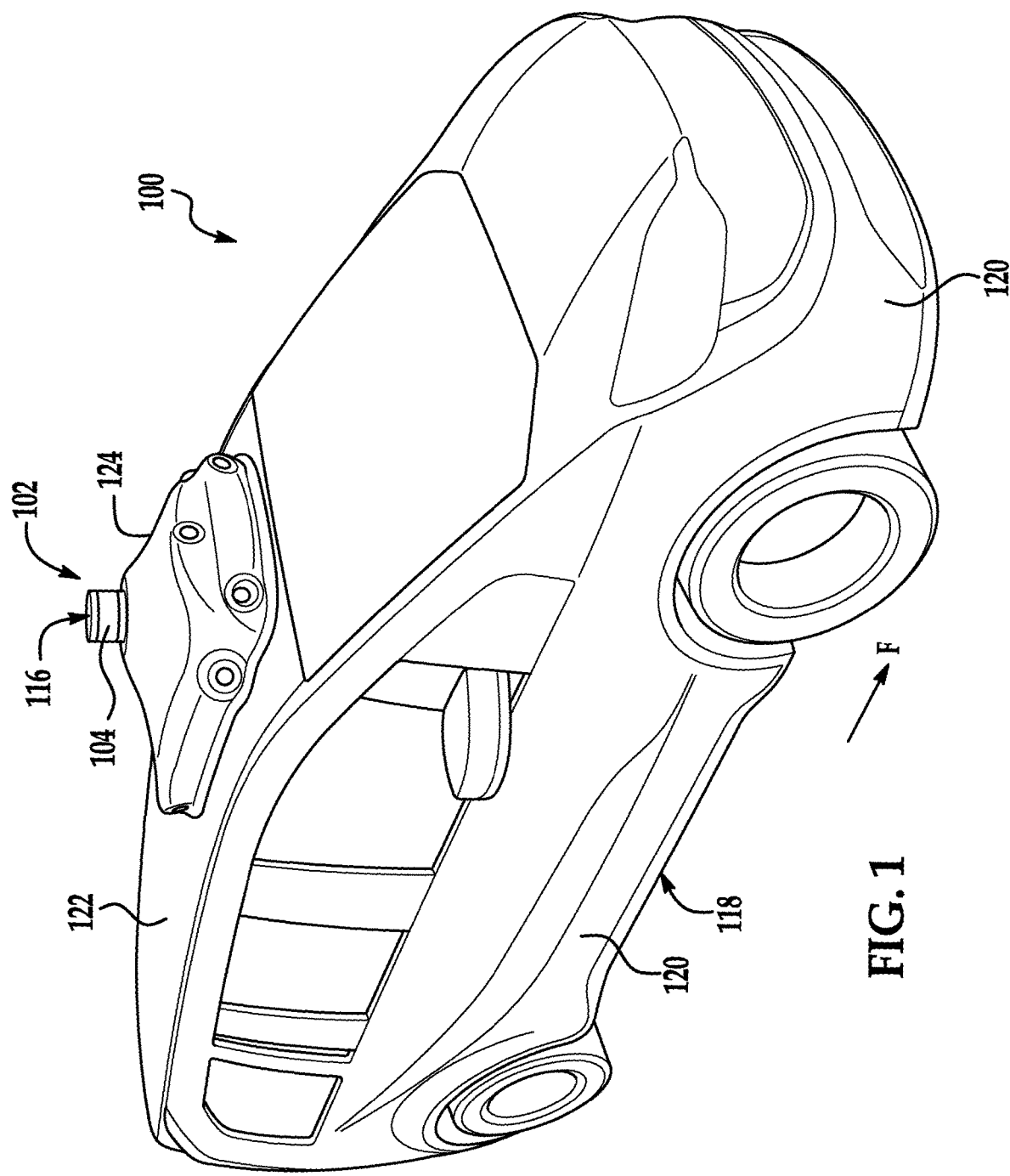
FIG. 1 is a perspective view of an example vehicle with an example sensor apparatus.

A sensor apparatus includes a cylindrical sensor window defining an axis, and an air nozzle positioned at one end of the sensor window and shaped to direct airflow in a direction parallel to the axis across the sensor window. The air nozzle extends circumferentially relative to the axis around the sensor window. The air nozzle is formed of an inner edge and an outer edge each extending circumferentially relative to the axis around the sensor window. The inner edge is circular with a radius at least as great as an outer radius of the sensor window. The outer edge includes a first portion and a second portion. The first portion of the outer edge has a semicircular shape with a radius smaller than the outer radius of the sensor window. The second portion of the outer edge extends circumferentially relative to the axis around the sensor window from the first portion to the first portion at a constant radial distance from the inner edge.

The first portion of the outer edge may extend from a first meeting point with the second portion to a second meeting point with the second portion, and a distance from the first meeting point to the second meeting point may be less than an outer diameter of the sensor window.

The air nozzle may include a first-portion panel for which the first portion of the outer edge forms an edge, and the first-portion panel may have a frustoconical shape. The frustoconical shape of the first-portion panel may increase in radius with distance from the first portion of the outer edge.

The air nozzle may be a first air nozzle, and the sensor apparatus may further include a second air nozzle shaped to direct airflow across the sensor window. The second air nozzle may be radially outside the first air nozzle relative to the axis.

The sensor apparatus may further include a pressurized chamber, and the first air nozzle and the second air nozzle may be open to the pressurized chamber.

The second air nozzle may be adjacent to the first portion of the outer edge of the first air nozzle. The first portion of the outer edge and the second air nozzle may be disposed in the same radial direction from the axis. The second air nozzle may be formed of an inside edge and an outside edge, and the inside edge may be a curve that is concave in the same radial direction relative to the axis as the first portion of the outer edge. The outside edge of the second air nozzle may be a curve that is concave in the same radial direction relative to the axis as the inside edge.

A length of the second air nozzle perpendicular to the radial direction may be less than a diameter of the sensor window.

The sensor apparatus may further include a dividing panel separating the first portion of the outer edge of the first air nozzle and the second air nozzle.

The first portion of the outer edge may extend less than 90° around the axis, and the second portion of the outer edge may extend more than 270° around the axis.

The first portion of the outer edge may be concave in a radially inward direction relative to the axis.

The sensor apparatus may further include a pressurized chamber, and the first air nozzle may be open to the pressurized chamber. The sensor apparatus may further include a pressurized-air source positioned to supply the pressurized chamber. The sensor apparatus may further include a computer communicatively coupled to the pressurized-air source, and the computer may be programmed to change a pressure of the pressurized-air source based on a speed of a vehicle including the sensor window. The computer may be programmed to set the pressure of the pressurized-air source to a first pressure when the speed of the vehicle is below a speed threshold, and to set the pressure of the pressurized-air source to a second pressure when the speed of the vehicle is above the speed threshold, and the second pressure may be greater than the first pressure.

With reference to the Figures, a sensor apparatus 102 for a vehicle 100 includes a cylindrical sensor window 104 defining an axis A and a first air nozzle 106 positioned at one end of the sensor window 104 and shaped to direct airflow in a direction parallel to the axis A across the sensor window 104. The first air nozzle 106 extends circumferentially relative to the axis A around the sensor window 104. The first air nozzle 106 is formed of an inner edge 108 and an outer edge 110 each extending circumferentially relative to the axis A around the sensor window 104. The inner edge 108 is circular with a radius at least as great as an outer radius of the sensor window 104. The outer edge 110 includes a first portion 112 and a second portion 114. The first portion 112 of the outer edge 110 has a semicircular shape with a radius smaller than the outer radius of the sensor window 104. The second portion 114 of the outer edge 110 extends circumferentially relative to the axis A around the sensor window 104 from the first portion 112 to the first portion 112 at a constant radial distance from the inner edge 108.

The sensor apparatus 102 provides a resource-efficient way to prevent or eliminate a stagnation zone that can develop in front of the sensor window 104. A stagnation zone is a volume of air in front of the sensor window 104 that is generally not moving relative to the sensor window 104 as the vehicle 100 moves forward. The relative positions, sizes, and shapes of the inner edge 108 and outer edge 110 of the first air nozzle 106 serve to blow a stagnation zone off of the sensor window 104. The portion of the first air nozzle 106 formed by the first portion 112 of the outer edge 110 has a greater radial width than the portion of the first air nozzle 106 formed by the second portion 114 of the outer edge 110 does and so has a greater energy output. The first air nozzle 106 can remove a stagnation zone with a small amount of airflow, making efficient use of the energy required to produce the airflow. Once a stagnation zone is removed from in front of the sensor window 104, the first air nozzle 106 can provide an air curtain that can prevent debris, dust, precipitation, etc. from contacting the sensor window 104.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input, based in part on data received from a sensor 116 of the sensor apparatus 102.

The vehicle 100 includes a body 118. The body 118 includes body panels 120 partially defining an exterior of the vehicle 100. The body panels 120 may present a class-A surface, e.g., a finished surface exposed to view by a customer and free of unaesthetic blemishes and defects. The body panels 120 include, e.g., a roof 122, etc.

A housing 124 for the sensor 116 and other sensors is attachable to the vehicle 100, e.g., to one of the body panels 120 of the vehicle 100, e.g., the roof 122. For example, the housing 124 may be shaped to be attachable to the roof 122, e.g., may have a shape matching a contour of the roof 122. The housing 124 may be attached to the roof 122, which can provide the sensors 116 with an unobstructed field of view of an area around the vehicle 100. The housing 124 may be formed of, e.g., plastic or metal.

Figure 2:
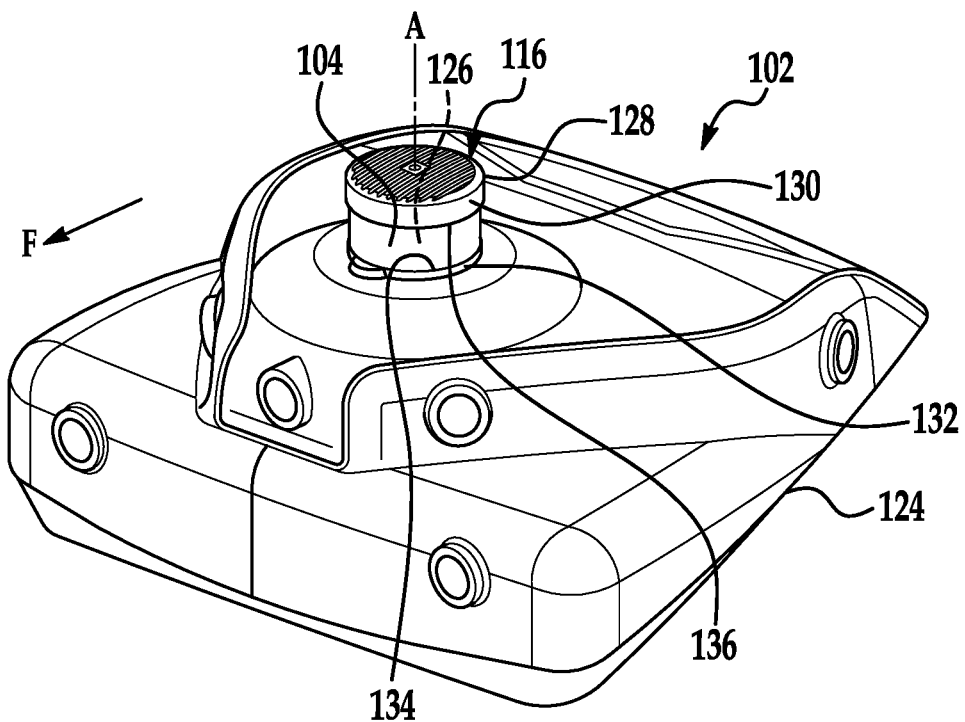
FIG. 2 is a perspective view of the sensor apparatus.

With reference to FIG. 2, the sensor apparatus 102 includes the sensor 116. The sensor 116 is supported by the housing 124. The sensor 116 can be disposed on top of the housing 124 at a highest point of the housing 124. The sensor 116 has a cylindrical shape and defines the axis A.

The sensor 116 may be designed to detect features of the outside world; for example, the sensor 116 may be a radar sensor, a scanning laser range finder, a light detection and ranging (LIDAR) device, or an image processing sensor such as a camera. In particular, the sensor 116 may be a LIDAR device, e.g., a scanning LIDAR device. A LIDAR device detects distances to objects by emitting laser pulses at a particular wavelength and measuring the time of flight for the pulse to travel to the object and back. The operation of the sensor 116 is performed by a sensing device 126 inside a sensor housing 128. The sensor 116 has a field of view encompassing a region from which the sensor 116 receives input.

The sensor 116 includes the sensor housing 128. The sensor housing 128 includes a sensor-housing cap 130, the sensor window 104, and a sensor-housing base 132. The sensor-housing cap 130 is disposed directly above the sensor window 104, and the sensor-housing base 132 is disposed directly below the sensor window 104. The sensor-housing cap 130 and the sensor-housing base 132 are vertically spaced apart by a height of the sensor window 104.

The sensor window 104 is oriented generally vertically, i.e., extends up and down. The sensor window 104 is cylindrical and defines the axis A, which is oriented vertically. The sensor window 104 extends around the axis A. The sensor window 104 can extend fully around the axis A, i.e., 360°, or partially around the axis A. The sensor window 104 extends along the axis A, i.e., vertically, from a bottom edge 134 to a top edge 136. The bottom edge 134 contacts the sensor-housing base 132, and the top edge 136 contacts the sensor-housing cap 130. The sensor window 104 has an outer radius. The outer radius of the sensor window 104 may be the same as an outer radius of the sensor-housing cap 130 and/or of the sensor-housing base 132; in other words, the sensor window 104 may be flush or substantially flush with the sensor-housing cap 130 and/or the sensor-housing base 132. "Substantially flush" means a seam between the sensor window 104 and the sensor-housing cap 130 or sensor-housing base 132 does not cause turbulence in air flowing along the sensor window 104. At least some of the sensor window 104 is transparent with respect to whatever medium the sensing device 126 is capable of detecting. For example, if the sensor 116 is a LIDAR device, then the sensor window 104 is transparent with respect to visible light at the wavelengths generated and received by the sensing device 126. The field of view of the sensor 116 extends through the sensor window 104.

Figure 3:
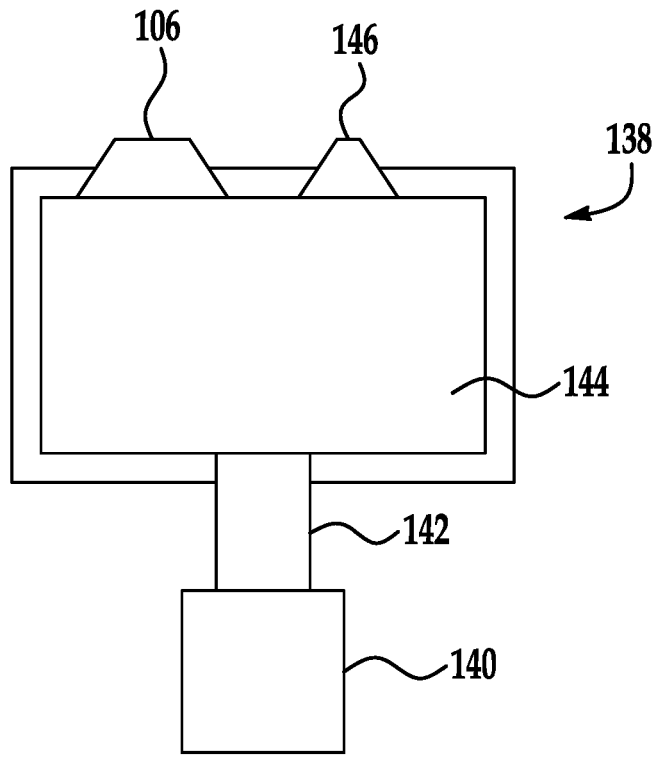
FIG. 3 is a diagram of an example air cleaning system of the sensor apparatus.

With reference to FIG. 3, an air cleaning system 138 includes a pressurized-air source 140, a filter 142, a pressurized chamber 144, the first air nozzle 106, and a second air nozzle 146. The pressurized-air source 140, the filter 142, and the first air nozzle 106 and second air nozzle 146 are fluidly connected to each other (i.e., fluid can flow from one to the other) in sequence through the pressurized chamber 144.

The pressurized-air source 140 increases the pressure of a gas by, e.g., forcing additional gas into a constant volume. The pressurized-air source 140 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The pressurized-air source 140 is positioned to supply the first air nozzle 106 and second air nozzle 146 via the pressurized chamber 144. The pressurized-air source 140 is adjustable and can increase or decrease the pressure of the pressurized chamber 144. A single pressurized-air source 140 can supply the first air nozzle 106 and second air nozzle 146 with airflow because of the relative sizing and positions of the first air nozzle 106 and second air nozzle 146.

The filter 142 removes solid particulates such as dust, pollen, mold, dust, and bacteria from air flowing through the filter 142. The filter 142 may be any suitable type of filter, e.g., paper, foam, cotton, stainless steel, oil bath, etc.

The housing 124 includes the pressurized chamber 144. The pressurized chamber 144 is disposed inside the housing 124. The pressurized-air source 140 can be positioned to pressurize the pressurized chamber 144, i.e., positioned to draw in air from outside the housing 124 and output air into the pressurized chamber 144.

The first air nozzle 106 and second air nozzle 146 are open to the pressurized chamber 144. Air in the pressurized chamber 144 is forced out through the first air nozzle 106 and second air nozzle 146 because the pressurized chamber 144 is at greater than atmospheric pressure. As the pressure in the pressurized chamber 144 is increased, a greater volume of air passes through the first air nozzle 106 and second air nozzle 146 at a higher speed.

Figure 4:
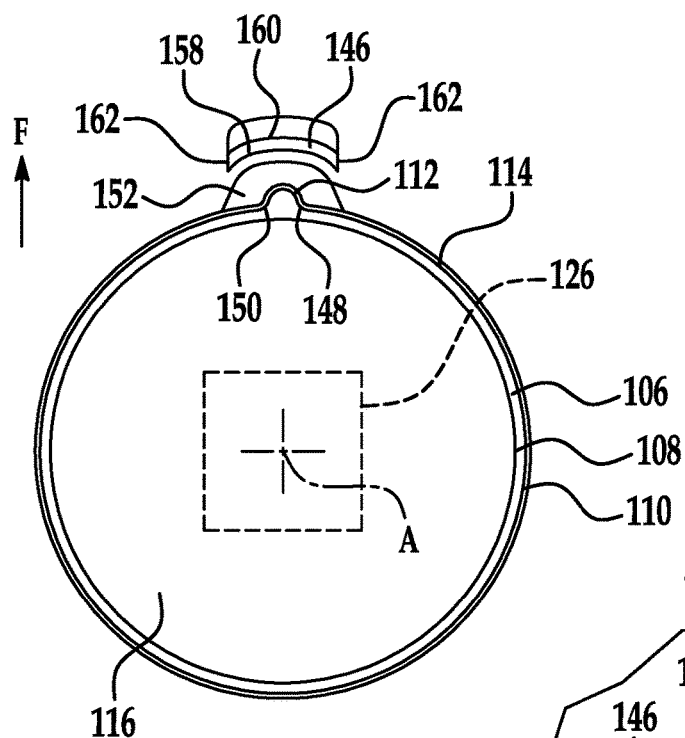
FIG. 4 is a top view of a portion of the sensor apparatus.
Figure 5:
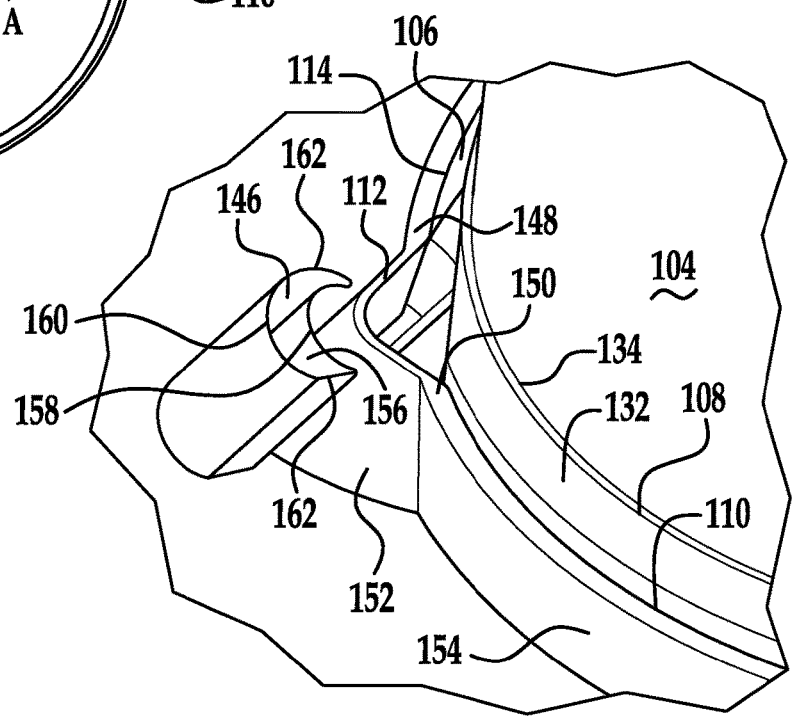
FIG. 5 is a perspective view of a portion of the sensor apparatus.

With reference to FIGS. 4 and 5, the first air nozzle 106 is positioned at one end, e.g., a bottom end, of the sensor window 104. The first air nozzle 106 is positioned below the bottom edge 134 of the sensor window 104. The first air nozzle 106 extends circumferentially relative to the axis A completely around the sensor window 104, i.e., 360°. The first air nozzle 106 is shaped to direct airflow from the pressurized chamber 144 in a direction parallel to the axis, e.g., upward, across the sensor window 104.

The first air nozzle 106 is formed of an inner edge 108 and an outer edge 110 each extending circumferentially relative to the axis A completely around the sensor window 104, i.e., 360°. The inner edge 108 is circular with a radius at least as great as an outer radius of the sensor window 104. For example, the radius of the inner edge 108 can be slightly greater than the outer radius of the sensor window 104.

The outer edge 110 includes the first portion 112 and the second portion 114. The second portion 114 of the outer edge 110 extends circumferentially relative to the axis A around the sensor window 104 from the first portion 112 to the first portion 112 at a constant radial distance from the inner edge 108. For example, the second portion 114 of the outer edge 110 extends more than 270° around the axis A. The first air nozzle 106 has a constant radial width along the second portion 114 of the outer edge 110.

The first portion 112 of the outer edge 110 has a semicircular shape with a radius smaller than the outer radius of the sensor window 104. The first portion 112 of the outer edge 110 is concave in a radially inward direction relative to the axis A; in other words, the first portion 112 of the outer edge 110 bows radially outward relative to the axis A. The first portion 112 of the outer edge 110 extends from a first meeting point 148 with the second portion 114 to a second meeting point 150 with the second portion 114. A linear distance from the first meeting point 148 to the second meeting point 150 is less than an outer diameter of the sensor window 104. In other words, a projected width of the first portion 112 of the outer edge 110 is less than a projected width of the sensor window 104. The greater airflow afforded by the first portion 112 of the outer edge 110 is thus concentrated at a location at which stagnation is mostly likely to occur. To the same benefit, the first portion 112 of the outer edge 110 extends less than 90° around the axis A; i.e., an angle in a plane orthogonal to the axis A from the first meeting point 148 to the axis A to the second meeting point 150 is less than 90°.

The first air nozzle 106 can include a first-portion panel 152 for which the first portion 112 of the outer edge 110 forms an edge, specifically an upper edge. The first-portion panel 152 has a frustoconical shape defining an axis parallel to the axis A. The frustoconical shape of the first-portion panel 152 increases in radius with distance from the first portion 112 of the outer edge 110; in other words, the frustoconical shape is oriented to get wider going downward from the first portion 112 of the outer edge 110. The shape of the first-portion panel 152 provides better aerodynamics for the vehicle 100 as the vehicle 100 travels forward and directs ambient airflow away from a potential stagnation zone in the front middle of the sensor window 104.

The first air nozzle 106 can include a second-portion panel 154 for which the second portion 114 of the outer edge 110 forms an edge, specifically an upper edge. The second-portion panel 154 extends circumferentially relative to the axis A around the sensor window 104 from the first-portion panel 152 to the first-portion panel 152. For example, the second-portion panel 154 extends more than 270° around the axis A. The second-portion panel 154 can have a partially cylindrical shape centered on the axis A and extending downward from the second portion 114 of the outer edge 110.

The second air nozzle 146 is radially outside the first air nozzle 106 relative to the axis A and adjacent to the first portion 112 of the outer edge 110 of the first air nozzle 106. The first portion 112 of the outer edge 110 and the second air nozzle 146 are disposed in the same radial direction from the axis A, specifically a vehicle-forward direction F (as shown in FIG. 2). The sensor apparatus 102 can further include a dividing panel 156 separating the first portion 112 of the outer edge 110 of the first air nozzle 106 and the second air nozzle 146. The position of the second air nozzle 146 can concentrate greater airflow at a potential stagnation zone of the sensor window 104.

The second air nozzle 146 is shaped to direct airflow across the sensor window 104. The second air nozzle 146 is formed of an inside edge 158, an outside edge 160, and two connecting edges 162 connecting the inside edge 158 and the outside edge 160. The inside edge 158 is a curve that is concave in the same radial direction relative to the axis A as the first portion 112 of the outer edge 110, i.e., bows radially outward relative to the axis A, i.e., bows outward in a vehicle-forward direction F. The outside edge 160 of the second air nozzle 146 is a curve that is concave in the same radial direction relative to the axis as the inside edge 158, i.e., bows radially outward relative to the axis A, i.e., bows outward in a vehicle-forward direction F. A linear length of the second air nozzle 146 perpendicular to the radial direction, i.e., vehicle-forward direction F, is less than a diameter of the sensor window 104. In other words, a projected width of the second air nozzle 146 in the vehicle-forward direction F is less than a projected width of the sensor window 104 in the vehicle-forward direction F. The greater airflow afforded by the second air nozzle 146 is thus concentrated at a location at which stagnation is mostly likely to occur.

Figure 6:
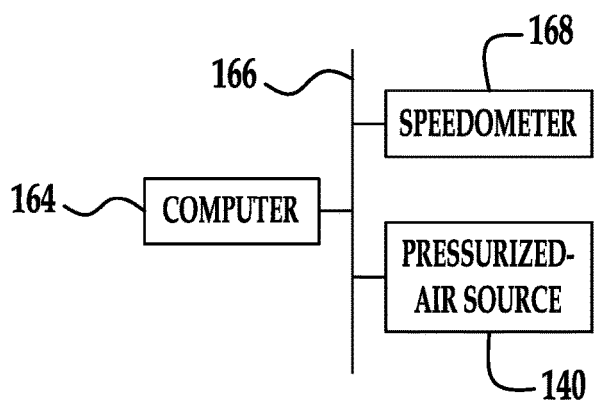
FIG. 6 is a block diagram of an example control system of the sensor apparatus.

With reference to FIG. 6, the vehicle 100 includes a computer 164. The computer 164 is a microprocessor-based computing device, e.g., a generic computing device including a processor and a memory, an electronic controller or the like, a field-programmable gate array (FPGA), an application-specific integrated circuit (ASIC), etc. The computer 164 can include a processor, a memory, etc. The memory of the computer 164 includes media for storing instructions executable by the processor as well as for electronically storing data and/or databases, and/or the computer 164 can include structures such as the foregoing by which programming is provided. The computer 164 can be multiple computers coupled together.

The computer 164 may transmit and receive data through a communications network 166 such as a controller area network (CAN) bus, Ethernet, WiFi, Local Interconnect Network (LIN), onboard diagnostics connector (OBD-II), and/or by any other wired or wireless communications network. The computer 164 may be communicatively coupled to a speedometer 168, the pressurized-air source 140, and other components via the communications network 166.

The vehicle 100 includes the speedometer 168. The speedometer 168 may be any sensor suitable for measuring the speed of the vehicle 100, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 100.

Figure 7:
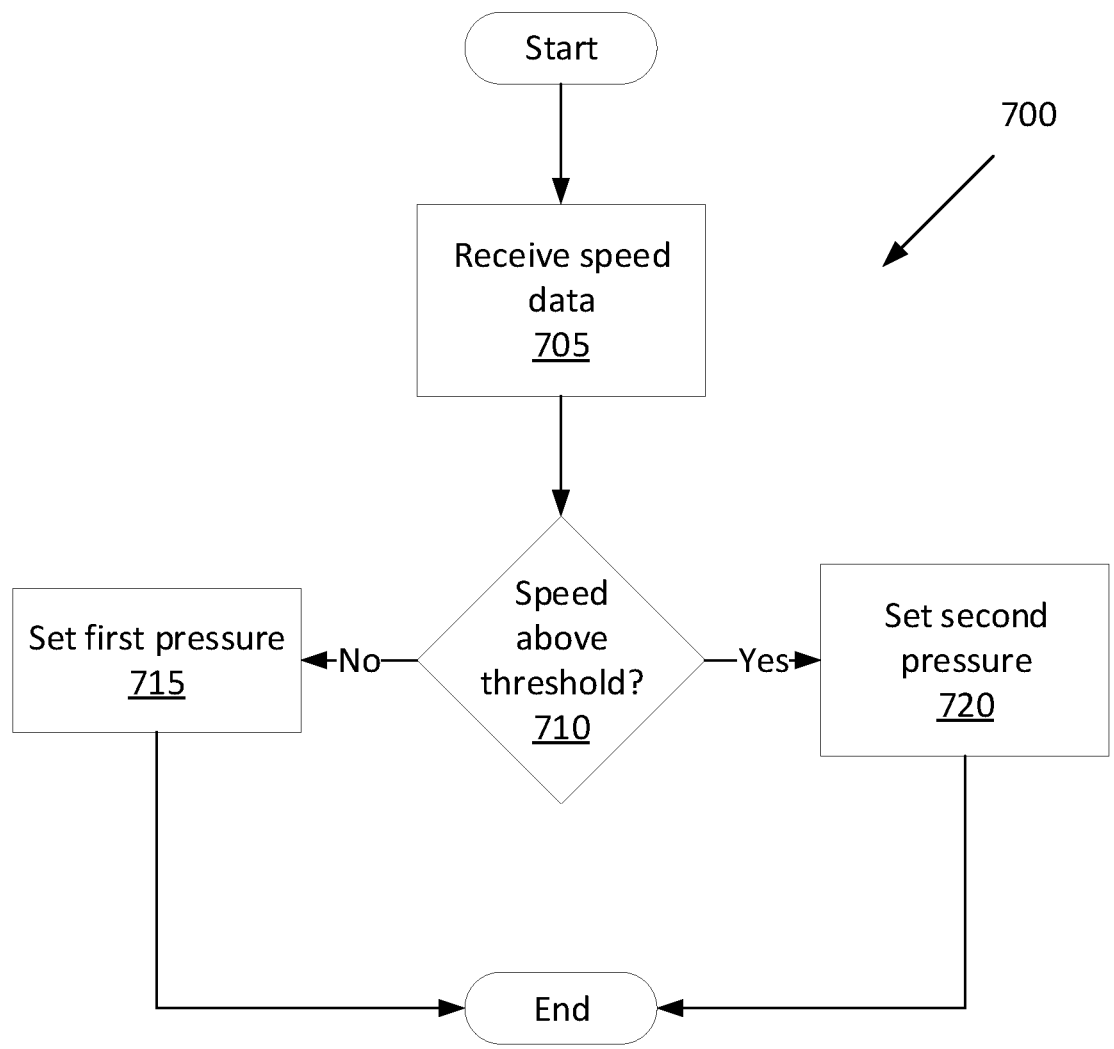
FIG. 7 is a process flow diagram of an example process for controlling the air cleaning system of the sensor apparatus.

FIG. 7 is a process flow diagram illustrating an exemplary process 700 for controlling the air cleaning system 138 of the sensor apparatus 102. The memory of the computer 164 stores executable instructions for performing the steps of the process 700 and/or programming can be implemented in structures such as mentioned above. As a general overview of the process 700, the computer 164 receives speed data from the speedometer 168 and changes a pressure of the pressurized-air source 140 based on a speed of the vehicle 100. Specifically, the computer 164 can set the pressure of the pressurized-air source 140 at a first, comparatively lower pressure in response to the speed of the vehicle 100 being below a threshold, and the computer 164 can set the pressure of the pressurized-air source 140 at a second, comparatively higher pressure in response to the speed of the vehicle 100 being above the threshold. The first pressure and the second pressure can be chosen from a plurality of preset, discrete pressure levels for the pressurized-air source 140. Using the threshold can provide an optimum use of the discrete pressure levels.

The process 700 begins in a block 705, in which the computer 164 receives speed data from the speedometer 168 via the communications network 166. The speed data specifies the speed of the vehicle 100, e.g., in miles per hour.

Next, in a decision block 710, the computer 164 determines whether the speed of the vehicle 100 is above the threshold. The threshold is a value stored in the memory of the computer 164 and is in the same units as the speed of the vehicle 100, e.g., miles per hour. The threshold can be chosen based on experimental wind tunnel testing or computational fluid-dynamics testing to determine the pressure from the pressurized-air source 140 needed to remove any stagnation zone from in front of the sensor window 104. If the speed of the vehicle 100 is below the threshold, the process 700 proceeds to a block 715. If the speed of the vehicle 100 is above the threshold, the process 700 proceeds to a block 720.

In the block 715, the computer 164 sets the pressure of the pressurized-air source 140 to the first pressure. The first pressure is chosen to be sufficient to remove a stagnation zone from in front of the sensor window 104 at speeds up to the threshold. After the block 715, the process 700 ends.

In the block 720, the computer 164 sets the pressure of the pressurized-air source 140 to the second pressure. The second pressure is greater than the first pressure. The second pressure is chosen to be sufficient to remove a stagnation zone from in front of the sensor window 104 at speeds from the threshold up to a preset speed, e.g., a maximum operating speed for autonomous operation of the vehicle 100. After the block 720, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Terms such as "front," "forward," "back," "rearward," "left," "right," "lateral," etc., are understood relative to the vehicle 100.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor apparatus comprising:
a cylindrical sensor window defining an axis along a center of the cylindrical sensor window; and
an air nozzle positioned at one end of the sensor window and shaped to direct airflow across the sensor window in a direction parallel to the axis;
wherein the air nozzle extends around the sensor window in a circumferential direction relative to the axis;
the air nozzle is formed of an inner edge and an outer edge each extending around the sensor window in the circumferential direction relative to the axis, the outer edge facing an ambient environment;
the inner edge is circular with a radius at least as great as an outer radius of the sensor window;
the outer edge includes a first portion and a second portion;
the first portion of the outer edge has a semicircular shape with a radius smaller than the outer radius of the sensor window; and
the second portion of the outer edge extends around the sensor window from the first portion to the first portion at a constant radial distance from the inner edge.

2. The sensor apparatus of claim 1, wherein the first portion of the outer edge extends from a first meeting point with the second portion to a second meeting point with the second portion, and a distance from the first meeting point to the second meeting point is less than an outer diameter of the sensor window.

3. The sensor apparatus of claim 1, wherein the air nozzle includes a first-portion panel for which the first portion of the outer edge forms an edge, and the first-portion panel has a frustoconical shape.

4. The sensor apparatus of claim 3, wherein the frustoconical shape of the first-portion panel increases in radius with distance from the first portion of the outer edge.

5. The sensor apparatus of claim 1, wherein the air nozzle is a first air nozzle, the sensor apparatus further comprising a second air nozzle shaped to direct airflow across the sensor window.

6. The sensor apparatus of claim 5, wherein the second air nozzle is radially outside the first air nozzle relative to the axis.

7. The sensor apparatus of claim 5, further comprising a pressurized chamber, wherein the first air nozzle and the second air nozzle are open to the pressurized chamber.

8. The sensor apparatus of claim 5, wherein the second air nozzle is adjacent to the first portion of the outer edge of the first air nozzle.

9. The sensor apparatus of claim 8, wherein the first portion of the outer edge and the second air nozzle are disposed in the same radial direction from the axis.

10. The sensor apparatus of claim 9, wherein the second air nozzle is formed of an inside edge and an outside edge, and the inside edge is a curve that is concave in the same radial direction relative to the axis as the first portion of the outer edge.

11. The sensor apparatus of claim 10, wherein the outside edge of the second air nozzle is a curve that is concave in the same radial direction relative to the axis as the inside edge.

12. The sensor apparatus of claim 9, wherein a length of the second air nozzle perpendicular to the radial direction is less than a diameter of the sensor window.

13. The sensor apparatus of claim 8, further comprising a dividing panel separating the first portion of the outer edge of the first air nozzle and the second air nozzle.

14. The sensor apparatus of claim 1, wherein the first portion of the outer edge is concave in a radially inward direction relative to the axis.

15. The sensor apparatus of claim 1, further comprising a pressurized chamber, wherein the first air nozzle is open to the pressurized chamber.

16. The sensor apparatus of claim 15, further comprising a pressurized-air source positioned to supply the pressurized chamber.

17. The sensor apparatus of claim 16, further comprising a computer communicatively coupled to the pressurized-air source, wherein the computer is programmed to change a pressure of the pressurized-air source based on a speed of a vehicle including the sensor window.

18. The sensor apparatus of claim 17, wherein the computer is programmed to set the pressure of the pressurized-air source to a first pressure when the speed of the vehicle is below a speed threshold, and to set the pressure of the pressurized-air source to a second pressure when the speed of the vehicle is above the speed threshold, wherein the second pressure is greater than the first pressure.

19. A sensor apparatus comprising:
a cylindrical sensor window defining an axis; and
an air nozzle positioned at one end of the sensor window and shaped to direct airflow across the sensor window in a direction parallel to the axis;

wherein the air nozzle extends around the sensor window in a circumferential direction relative to the axis;

the air nozzle is formed of an inner edge and an outer edge each extending around the sensor window in the circumferential direction relative to the axis;

the inner edge is circular with a radius at least as great as an outer radius of the sensor window;

the outer edge includes a first portion and a second portion;

the first portion of the outer edge has a semicircular shape with a radius smaller than the outer radius of the sensor window;

the second portion of the outer edge extends around the sensor window from the first portion to the first portion at a constant radial distance from the inner edge;

the air nozzle includes a first-portion panel for which the first portion of the outer edge forms an edge; and the first-portion panel has a frustoconical shape.

20. A sensor apparatus comprising:

a cylindrical sensor window defining an axis;

a first air nozzle positioned at one end of the sensor window and shaped to direct airflow across the sensor window in a direction parallel to the axis; and a second air nozzle shaped to direct airflow across the sensor window;

wherein the first air nozzle extends around the sensor window in a circumferential direction relative to the axis;

the first air nozzle is formed of an inner edge and an outer edge each extending around the sensor window in the circumferential direction relative to the axis;

the inner edge is circular with a radius at least as great as an outer radius of the sensor window;

the outer edge includes a first portion and a second portion;

the first portion of the outer edge has a semicircular shape with a radius smaller than the outer radius of the sensor window; and the second portion of the outer edge extends around the sensor window from the first portion to the first portion at a constant radial distance from the inner edge.

* * * * *